United States Patent [19]

Mueller

[11] Patent Number: 4,876,851
[45] Date of Patent: Oct. 31, 1989

[54] INFRARED RADIATION SCREENING DEVICE

[75] Inventor: Werner Mueller, Pullenhofen, Fed. Rep. of Germany

[73] Assignee: Messerschmitt-Boelkow-Blohm GmbH, Munich, Fed. Rep. of Germany

[21] Appl. No.: 173,193

[22] Filed: Mar. 24, 1988

[30] Foreign Application Priority Data

Apr. 11, 1987 [DE] Fed. Rep. of Germany ....... 3712328

[51] Int. Cl.⁴ ................................................. F02K 1/38
[52] U.S. Cl. .......................................... 60/264; 60/34.5
[58] Field of Search ........................ 60/39.5, 262, 264; 239/127.3, 265.17, DIG. 19

[56] References Cited

U.S. PATENT DOCUMENTS

| | | |
|---|---|---|
| 3,970,252 | 7/1976 | Smale et al. |
| 3,981,143 | 9/1976 | Ross et al. ............................. 60/264 |
| 3,981,448 | 9/1976 | Demogenes et al. ............. 239/127.3 |
| 4,004,416 | 1/1977 | Amelio et al. ........................ 60/39.5 |
| 4,007,587 | 2/1977 | Banthin et al. ................... 239/127.3 |
| 4,182,495 | 1/1980 | Borgmeier et al. ........ 239/DIG. 19 |
| 4,214,441 | 7/1980 | Mouritsen et al. ..................... 60/262 |
| 4,289,168 | 9/1981 | Lecourt et al. ............. 239/DIG. 19 |
| 4,295,332 | 10/1981 | Steyer et al. ..................... 239/265.17 |
| 4,355,507 | 10/1982 | Caffey et al. ......................... 60/39.5 |
| 4,637,550 | 1/1987 | Nash ........................... 239/DIG. 19 |

FOREIGN PATENT DOCUMENTS 3127106 1/1983 Fed. Rep. of Germany.

*Primary Examiner*—Louis J. Casaregola
*Attorney, Agent, or Firm*—W. G. Fasse; D. H. Kane, Jr.

[57] ABSTRACT

An infrared radiation screening arrangement includes a special core structure and an outer gas guiding ring which together serve to block the direct view of a hot engine exhaust gas outlet and associated hot engine parts in order to hinder IR-detection of the engine. The gas guiding ring and the core structure define a cooling air guide channel with cooling air inlets for cooling the components of the arrangement and for cooling the exhaust gas stream which is ejected in an essentially unaltered direction.

6 Claims, 1 Drawing Sheet

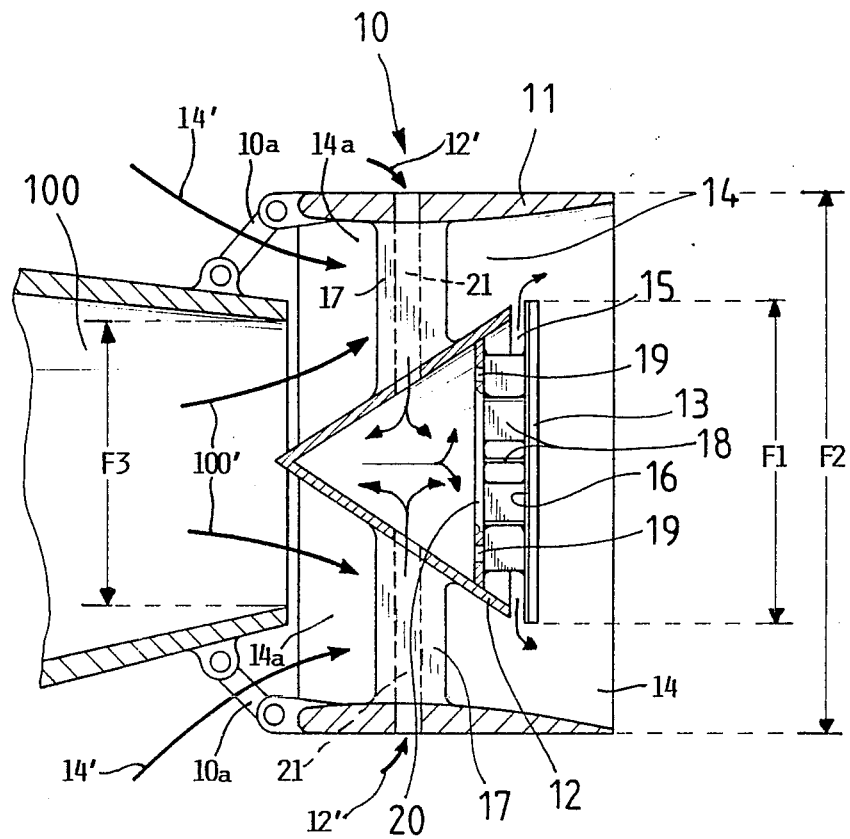

INFRARED RADIATION SCREENING DEVICE

FIELD OF THE INVENTION

The invention relates to an infrared radiation screening device, especially for screening the infrared emission of a hot engine exhaust gas stream by blocking the direct view into the exhaust gas outlet so as to prevent infrared detection.

DESCRIPTION OF THE PRIOR ART

Such arrangement for infrared screening have become known in various forms. For example, U.S. Pat. No. 3,970,252 discloses a cooling arrangement for a turbo-engine which is so constructed and arranged that it blocks the direct view into the hot exhaust gas outlet nozzle and thereby hinders infrared detection. This known arrangement includes a pear-shaped housing which is arranged directly in the exhaust gas outlet and which cools the hot exhaust gas. The inner chamber of the pear-shaped housing is constructed so that the cool air streaming in from the outside is directed through slots into the exhaust gas channel for cooling the hot exhaust gasses. Although the known arrangement also blocks the direct view of infrared radiating engine parts, the effort and expense of production of the known arrangement is very high. Furthermore, the known IR screening arrangement as applied to engines of high performance aircraft operating at mach number speeds, would seriously reduce the engine's power output due to the high pressure heads occurring in the pear-shaped housing.

A further known arrangement for infrared shielding or for hindering IR detection is disclosed in German Patent Publication (DE-OS) No. 3,127,106, wherein a direct view onto the exhaust gas outlet surface is blocked by a gas guiding element. This element receives the hot exhaust gas, simultaneously cools it, and directs it out of the original flow direction through a certain angle, and then expels the cooled exhaust gas to the atmosphere in a direction nearly perpendicular to the flight direction. The arrangement is also not suitable for use in high performance aircraft because it reduces the engine output power and especially because it impairs the aerodynamic characteristics and control or steering of the aircraft due to the redirected exhaust gas flow streaming from the engine nearly perpendicularly to its axis.

OBJECTS OF THE INVENTION

In view of the foregoing it is the aim of the invention to achieve the following objects singly or in combination:

to provide a device for blocking the direct view of hot IR radiating engine parts and the exhaust gas stream for substantially preventing an IR-detection;

to cool the exhaust stream of a turbine engine with such an arrangement;

to construct such an arrangement in a simple and inexpensive manner;

to avoid a pressure damming effect and thereby avoid adverse effects of such an arrangement, on the engine power, especially for high performance aircraft; and to avoid adverse effects of such an arrangement on the aircraft control, handling, and aerodynamics, by avoiding any impairment of the flow of or drastic redirection of the exhaust gas stream.

SUMMARY OF THE INVENTION

The above objects have been achieved in an infrared emission screening arrangement according to the invention, including an outer gas guiding ring attachable to the engine exhaust gas outlet and a conical core structure shrouded or enclosed within the gas guiding ring. A cover plate is attached to the core structure at its end facing downstream or in the direction of the exhaust gas flow. The surface F2 enclosed by the gas guiding ring is larger than the base surface F1 of the conical core structure (F2>F1). Thus, a cooling air channel is formed between the gas guiding ring forming one channel boundary and the core structure on the one hand, and the engine exhaust gas outlet on the other hand forming the other channel boundary. This cooling air channel provides an ejector effect.

According to detailed embodiments of the invention, the maximum outer diameter of the core structure and the associated cover plate is equal to or slightly larger than the inner diameter of the engine exhaust gas outlet. The core structure and the cover plate of the core structure may be made of a carbon fiber composite material or other similar fiber reinforced materials. A thermal insulating gap may be provided between the conical core structure and the cover plate. The cover plate may additionally be provided with a separate thermal insulating layer. The core structure is attached to the gas guide ring by means of three or four struts which may also be made of a carbon fiber composite material. The cover plate is attached to the core structure by means of several spacing struts.

BRIEF DESCRIPTION OF THE DRAWING

In order that the invention may be clearly understood, it will now be described, by way of example, with reference to the single FIGURE of the accompanying drawing showing a lengthwise section through the IR-emission screening arrangement of the invention attached to the exhaust gas outlet of an engine.

DETAILED DESCRIPTION OF PREFERRED EXAMPLE EMBODIMENTS AND OF THE BEST MODE OF THE INVENTION

As shown in the drawing an example embodiment of the infrared screening arrangement 10 according to the invention is attached to the exhaust gas outlet nozzle 100 of an engine exhaust gas outlet. The arrangement 10 includes a gas guide ring 11 effectively forming an outer housing of the arrangement 10. The gas guide ring 11 has a shape appropriate to the shape of the gas outlet nozzle 100, to which it is attached at an appropriate location with attachment means 10a of conventional construction. The specific shape and location of the attachment means 10a for the gas guide ring 11 will depend on the aircraft type and on the engine construction. For example, the arrangement of the invention is also employable with aircraft engines having a variable exhaust gas outlet cross-section. Therefore, the attachment means will be selected to accommodate such variable exhaust cross-section.

The inner diameter of the gas guide ring 11 is of such a size that a cooling air stream channel 14 of sufficient cross-sectional flow area is formed between the gas guide ring 11 and the outer diameter of the gas outlet nozzle 100. A so-called core structure 12 is held approximately in the center or coaxially with the axis of the gas guide ring 11 by means of three or four struts 17 which connect the core structure 12 to the gas guide ring 11. The core structure 12 is conically tapered in the flight direction or in the direction toward the exhaust gas outlet nozzle 100. The largest surface cross-section F1 or base area of the conical core structure 12 corresponds to, or is larger by a certain small amount than, the exhaust gas outlet surface area F3 of the engine outlet nozzle 100. The base end surface of the conical core structure 12 is provided with a cover plate 13, whereby the cover plate 13 is not directly connected to the conical surface of the core structure 12, but rather is attached by means of spacer struts 18 to a cone stiffening plate 20 which is provided with air flow holes 19.

An air gap 15 is formed between the base of the cone of the core structure 12 and the cover plate 13. Furthermore, the inner surface of the cover plate 13 facing the inner chamber of the core structure 12 is covered by a thermal insulating layer 16. The entire core structure 12 including the cover plate 13, as well as the gas guide ring 11, are made of a CFC carbon fiber composite material of carbon fibers bonded together by carbon. This material is able to withstand temperatures exceeding 2000° C. By these means, in contrast to the prior art, not only is a very high temperature resistance of the arrangement of the invention achieved, but also a considerable reduction of weight is achieved, thereby substantially reducing any impairment of the performance of the aircraft.

The described core structure 12 of the arrangement 10 according to the invention prevents IR sensors from having a direct line of sight view of the internal combustion chamber of the engine which is glowing at the elevated engine operating temperature. The outer gas guide ring 11 of the arrangement 10 is dimensioned and arranged so that a cooling air stream 14' is drawn in from the external air stream through the cooling air channel 14 so as to achieve a venturi nozzle or ejector effect. The hot exhaust gas stream 100' exits from the engine exhaust gas outlet 100 into the arrangement 10. There, the hot gas stream 100' is split or deflected around the core structure 12 and directed toward the inner wall surface or gas guide surface of the gas guide ring 11 where it is mixed with the cooling air stream 14' in the exhaust nozzle channel portion 14a which tapers into the channel portion 14 to form a nozzle. Thus, the exhaust gas stream 100' is cooled and is then ejected by an ejector effect to the atmosphere at an increased velocity in an essentially axial direction. This structure hardly impedes the flow of the exhaust gas, so that a pressure-damming effect and associated output power impairment are avoided. The core structure 12 is heated by the hot gas stream 100' so that a thermal potential is developed in the inner chamber of the core structure 12. In order to effectively cool the core structure 12, cooling air passages 21 are provided in the support struts 17 through which cooling air 12' is drawn from the external air stream into the inner chamber of the core structure 12. The cooling air stream 12' effectively cools the core structure 12 by circulating through the inner chamber of the core structure 12 and passing through air flow holes 19 of the cone stiffening plate 20 and then through the air gap 15 to be mixed with the cooled exhaust gas flow in the nozzle channel 14. The cooling air stream 12' is drawn through its cooling circuit including the air passages 21, the air flow holes 19, and the air gap 15 by a venturi suction effect created by the exhaust gas stream flowing in the nozzle channel 14.

Through this cooling air flow and the above described selection of materials for the arrangement according to the invention, a separate cooling arrangement as it was required in the prior art for an IR screening arrangement, has been obviated.

Although the invention has been described with reference to specific example embodiments, it will be appreciated, that it is intended to cover all modifications and equivalents within the scope of the appended claims.

What I claim is:

1. An apparatus for shielding infrared emissions of an operating engine for hindering IR-detection, comprising an outer gas guiding ring (11), pivotable link means (10a) for adjustably attaching said gas guiding ring to an exhaust outlet (100) of said engine, a conical core structure (12) arranged essentially in a concentrical position within said gas guiding ring (11) for forming a cooling air channel (14, 14') with an ejector effect between said exhaust outlet and said gas guiding ring and between said gas guiding ring and said conical core structure, a cover plate (13) secured to a large downstream directed end of said conical core structure for covering said large downstream directed end of said conical core structure, said engine exhaust outlet forming with an upstream end of said outer gas guiding ring a ring inlet for feeding cooling air into said cooling air channel having said ejector effect, strut means (17) for supporting said conical core structure and said cover plate in said concentrical position within said gas guiding ring, said gas guiding ring, said conical core structure, said cover plate, and said strut means being made of a carbon-fiber-carbon composite material having a high temperature resistance to form an integral unit which is position adjustable.

2. The arrangement of claim 1, wherein said cover plate of said conical core structure has a given diameter forming a surface area (F1) which is equal to or slightly greater than a corresponding inner diameter of said engine exhaust outlet forming a further surface area (F3), whereby a direct view of hot exhaust outlet components of said engine is blocked.

3. The apparatus of claim 1, further comprising a thermally insulating gap between said large end of said conical core structure and said cover plate, said gap permitting a flow of cooling air through said core structure.

4. The apparatus of claim 1, further comprising a layer of thermally insulating material arranged on at least one side of said cover plate.

5. The apparatus of claim 3, further comprising a plurality of spacer struts (18) for attaching said cover plate to said conical core structure with a spacing between said large end of said conical core structure and said cover plate for forming said thermally insulating gap.

6. The apparatus of claim 5, wherein said core structure support struts (17) comprise cooling air ducts (21) therein, wherein said conical core structure has cooling air inlets connected to said coling air ducts (21), said spacer struts (18) providing cooling air outflow passages from said conical core structure (12) through said thermally insulating gap, whereby cooling air can cool said support struts (21), said conical core structure (12), said spacer struts (18), and said cover plate (13).

* * * * *